United States Patent [19]

White et al.

[11] 3,738,167

[45] June 12, 1973

[54] AIRSPEED AND ALTITUDE MEASURING DEVICE

[75] Inventors: Douglas F. White, Bedminster, N.J.; Marvin D. Scadron, Glenview; Joseph C. Faul, Melrose Park, both of Ill.

[73] Assignee: American Standard Inc., New York, N.Y.

[22] Filed: June 22, 1970

[21] Appl. No.: 59,820

Related U.S. Application Data

[62] Division of Ser. No. 737,717, June 17, 1968.

[52] U.S. Cl. .................................................. 73/181
[51] Int. Cl. ............................................... G01c 21/00
[58] Field of Search .......................... 73/181, 194 E

[56] References Cited
UNITED STATES PATENTS
3,572,117   3/1971   Rodely ............................. 73/194 B OTHER PUBLICATIONS
Mair; "The Effect of a Rear-Mounted Disc...", The Aeronautical Quarterly, Nov., 1965, pages 355–360.

*Primary Examiner*—Donald O. Woodiel
*Attorney*—Sheldon H. Parker

[57] ABSTRACT

The airspeed of an airplane is determined by means of a device which includes an upstream cylindrical member and a downstream disc-like member spaced from said cylindrical member by a predetermined distance. Oscillations are produced in the air which passes around the cylindrical and disc structures and the frequency of the oscillations are measured. The frequency of the oscillations is directly related to the velocity of the fluid thus providing a direct determination of airspeed. The altitude of the airplane is computed with great accuracy, by measuring directly, the total air temperature and air stagnation pressure in addition to the airspeed, and using these quantities in standard formulas well known to those versed in the art.

1 Claim, 6 Drawing Figures

AIRSPEED AND ALTITUDE MEASURING DEVICE

This is a division of application Serial No. 737,717 filed June 17, 1968.

BACKGROUND OF THE INVENTION

1. Field of the Invention

This invention relates to the measuring of the airspeed of an airplane and to the determining of the altitude of the airplane by measuring total air temperature, air stagnation pressure and airspeed 2. Description of the Prior Art The determinations of instant airspeed values are normally made by measuring, at the airplane, the air temperature, the total air pressure and the static air pressure. Typically, the total air pressure and the static air pressure are measured by suitable aneroid devices connected to a pitot-static tube mounted in the undisturbed air stream of the airplane.

Unfortunately, the foregoing method of air speed determination is subject to inaccuracies which are due to the fact that the pitot-static tube is subjected to abrasion, particularly during the take-off and landing of the aircraft, and the calibration factor of the pitot-static tube is affected by abrasion. Furthermore, the surface contours of the airplane influence the static pressure determinations and the exact contour can vary not only from plane to plane but can vary in a particular plane depending upon the various stresses and strains experienced by the plane at various altitudes and speeds. Thus, even if each instrument is calibrated for the particular plane in which it is used, inaccuracies will be encountered. Similar problems arise if static pressure is sensed by means of a port in the aircraft fuselage.

The altitude of a plane is similarly determined by measuring such variables as static air pressure at ground level and at the airplane and the temperature at ground level and at the level of the airplane. The problems encountered in determining the airspeed, are also encountered in the altitude determination.

SUMMARY

It has now been found that the airspeed of an airplane can be measured directly, with great accuracy, and that the altitude of the airplane can be determined with great accuracy, by measuring directly, the airspeed, total air temperature and air stagnation pressure.

In accordance with the present invention, the airspeed is measured by means of a device which includes an upstream cylindrical member and a downstream disc-like member spaced from said cylindrical member by a predetermined distance. Oscillations are produced in the air which passes around the cylindrical and disc structures and the frequency of the oscillations are measured. The frequency of the oscillations is directly related to the velocity of the fluid thus providing a direct determination of airspeed.

BRIEF DESCRIPTION OF THE DRAWING

The objects and the advantages of the invention will be readily appreciated and understood by reference to the detailed description of the invention when considered in connection with the accompanying drawings wherein.

DESCRIPTION OF THE PREFERRED EMBODIMENTS

Figure 1:
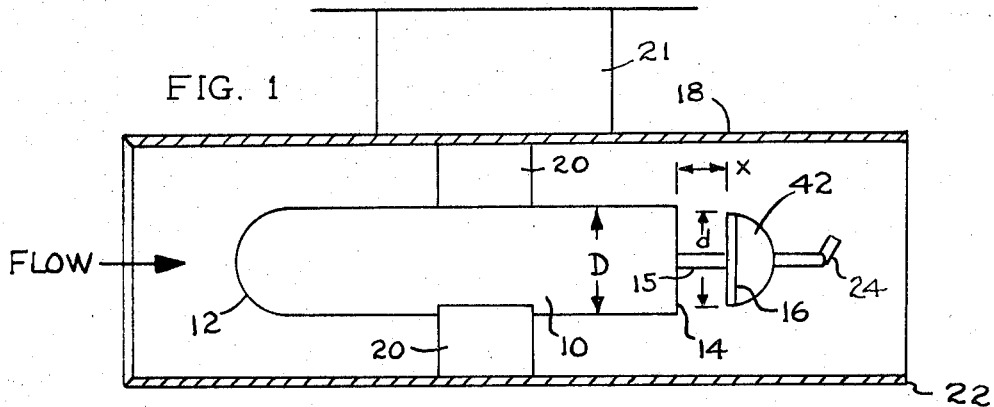
FIG. 1 is a fragmentary side elevational view, partly in cross-section, of an airspeed measuring device, in accordance with the present invention.

Basically, the device which must be employed is shown in FIG. 1. The apparatus illustrated therein includes a cylindrical body 10 having a curved nose 12 and a flat base 14 at its opposite end. Attached to the base 14 is a flat disc 16 of smaller diameter $d$ as compared to the diameter $D$ of the cylindrical body 10. The center of the disc is coincident with the longitudinal central axis of the body 10 and the disc is spaced axially from the base 14 by the distance $x$.

The body 10 and attached disc 16 are suspended at the center of a tube 18 by three thin vanes 20 connecting the exterior surface of the body 10 to the interior wall of the tube 18.

The dimensions of the vanes are not narrowly critical and primarily are dimensional so as to minimize their flow obstruction while still providing the requisite structural strength.

The tube 18 is secured to the fuselage of the airplane by means of a single vane 21. The tube should be spaced a sufficient distance from the surface of the fuselage such that it is beyond the boundary layer of the airplane. Typically, a distance of at least about three inches provides the desired result. The airspeed indicator can be located on the aircraft at any convenient position.

Although the cylinder 10 and disc 16 are shown mounted within a tube 18, they can be carried directly by the airplane without a protective or restrictive housing. The use of the tube or housing has the advantage of making the system insensitive to changes in the angle or altitude of the airplane.

As illustrated the vanes are aligned in planes which pass through the central longitudinal axis of the body 10 and the three planes of the three vanes are spaced apart angularly by 120°. The nose 12 faces a source of fluid flow (not shown) and is pointed upstream with respect to the fluid flow and the disc 16 is pointed downstream facing the exit end 22 of the tube 18, with the longitudinal axis of the body 10 substantially parallel to the mean axial fluid flow within tube 18.

Positioned on the stabilizer vane 42, is an oscillation responsive or sensitive element 24. For example a variety of temperature, pressure or velocity responsive devices such as a diaphragm transducer or a piezoelectric crystal for sensing pressure changes, or a thermistor or thermocouple for sensing temperature changes, can be used.

The element 24 can be mounted at a variety of positions, as for example on the cylinder 10, at or near the flat base 14 or on any portion of the disc 16, stabilizer 42 or on the tube 18, downstream of the flat base portion 14 of the cylinder 10.

The signal from the responsive device 24 is fed to signal conditioning equipment whose purpose is to transform the sensed fluid oscillations into an electrical waveform suitable as input to an air data computer and/or any other readout devices which may be appropriately used on the aircraft.

The ratio of the diameter of the disc to the diameter of the body, i.e., $d/D$, has an effect upon the stabilized oscillatory flow in the various flowmeter structures provided by the invention. This effect will vary further according to the particular modifying structural element that is used to further obstruct or split the fluid flow in order to stabilize the oscillations. However, in general the value of the ratio $d/D$ should be controlled within the range from about 0.6 to about 0.8.

Likewise, the ratio of the distance $x$ to the diameter of the body D, i.e., $x/D$, will also have an effect upon the stabilized oscillations generated in the flowmeter structures of the invention and the effect of the $x/D$ ratio will further vary according to the particular type of modifying structural element and the $d/D$ ratio that are employed. However, in general, the value of the $x/D$ ratio should be controlled within the range from about 0.28 to about 0.6.

These controls are not critical and essential in the sense that no stabilized oscillations will be generated when the structure of the apparatus is outside the controlled values. Rather, the values recommended above will encompass the relationships of structure in the apparatus of the invention which will give the best results in terms of the measurable amplitude of the stabilized oscillations. All other things being equal, it is more advantageous to maximize the amplitude of the stabilized oscillations at a given velocity and frequency in order to achieve the greatest magnitude of difference between the signal amplitude and the background noise detected by the sensor. In order to achieve such maximum magnitude of difference, the foregoing ranges of values of the ratios $d/D$ and $x/D$ should be used.

It is possible for the diameter of the disc to be decreased somewhat as a result of abrasion.

As previously noted, the calibration factor of the meter will not be affected by such a dimensional change, and only a slight decrease in the ratio of signal amplitude to background noise will be encountered.

The curved nose 12, of the body 10 will be the primary structure which is subjected to abrasion. However, the curvature of the nose does not influence the calibration factor, and in normal use, the length of the body 10 could not be affected to such an extent that the flow of fluid would be adversely affected.

Figure 2:
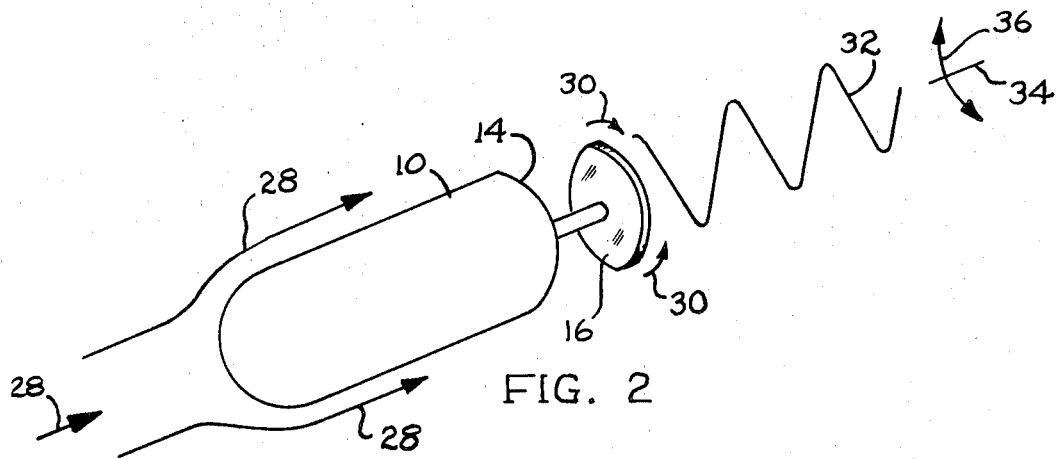
FIG. 2 is a perspective view of the cylindrical and disc portions of the structure of FIG. 1.

Referring now to FIG. 2, when a fluid such as air is flowed into the tube 18, the flow impinges upon the curved nose 12 of the body 10 and divides as shown by the arrows 28 to flow around and by the obstruction constituted by the body 10. When the fluid flow reaches the space between the disc 16 and flat base 14, it is disrupted or perturbed and as a result a downstream wake is generated in which the fluid flow traces an oscillatory motion as indicated by the arrows 30 and trace line 32.

At any given velocity of fluid flow, the oscillatory motion generated by the FIG. 2 structure is unstable, in that the plane in which the oscillation occurs, does not remain fixed and instead rotates about the projected central longitudinal axis 34 as indicated by the arrows 36. The rotation of the plane of oscillation is unpredictable both as to magnitude and angular direction at any given velocity or with change in velocity. As a result the responsive element 24 at times can be subjected to large changes in the strength or magnitude of the property to which it must respond. At times the measured amplitude and frequency of the motion can be lost in the frequency and amplitude of the background noise. Thus, the signals detected by the element 24 cannot be correlated to the mean flow velocity of the fluid unless the signal strength is stabilized.

Illustrated in FIG. 1, is a thin semi-circular vane 42 which is attached to the downstream side of disc 16 along a diameter thereof. While the vane 42 does not physically split the fluid flow before the flow reaches the space $x$ between the base 14 and disc 16, it is nevertheless highly effective to stabilize the oscillatory fluid flow in the downstream wake in a fixed plane coincident with or parallel to the plane of the vane. Hence, the sensor 24 is again enabled to detect the frequency and amplitude of the oscillatory motion in an organized and predictable manner, without the random variations, fluctuations and extinctions that are otherwise experienced with the unmodified apparatus of FIG. 2.

Figure 3:
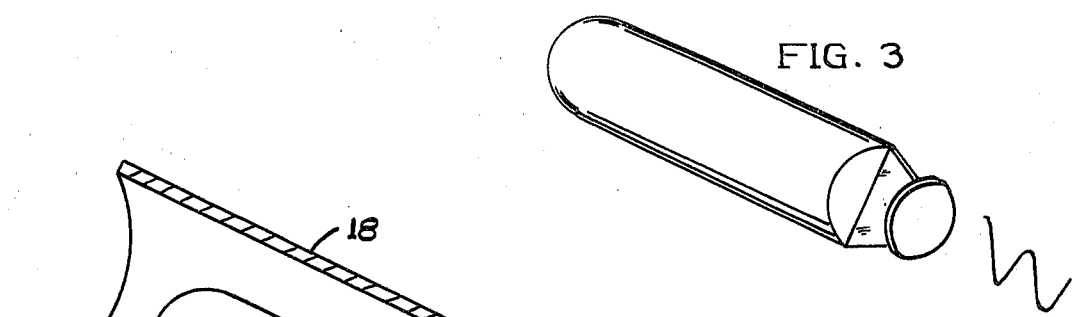
FIG. 3 is a perspective view of a modification of the structure of FIG. 2.

Referring now to FIG. 3, a modification of the apparatus of FIG. 1 is illustrated whereby a thin plate 44 divides into two halves the space between the base 14 and disc 16 defined by the peripheries and opposed faces of the base and disc. The plate 44 is attached along diameters of the base 14 and disc 16 lying in the same plane. The plate 44 divides the space between the base 14 and disc 16 into two symmetrical halves and is effective to stabilize the oscillatory fluid flow in the downstream wake in a fixed plane coincident with or parallel to the plate 44 as illustrated by the trace 32.

Figure 4:
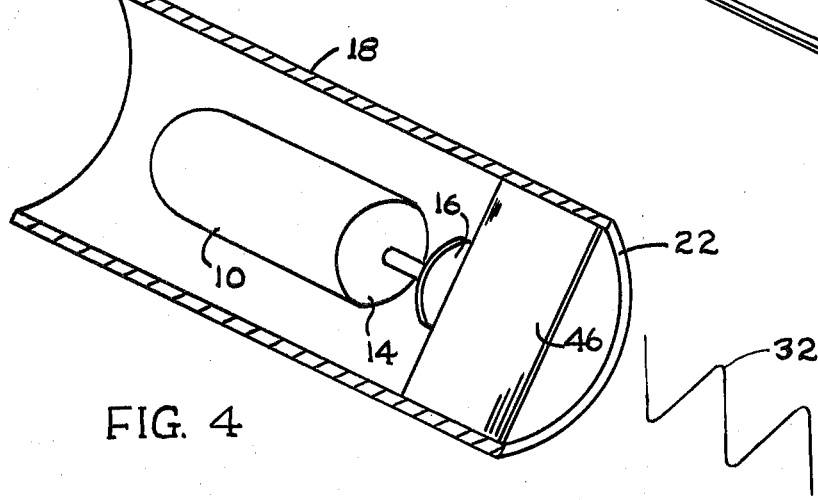
FIG. 4 is a fragmentary, perspective view, partly in cross-section, of a still further modification of the structure of FIG. 2.

FIG. 4 illustrates another modification of the apparatus of FIG. 1 whereby a large flat tail 46 is attached to the downstream side of disc 16 along a diameter thereof. The tail 46 extends along and beyond the attachment diameter up to the interior wall of the tube 18 and also projects out beyond the exit end 22 of the tube. Thus, the tail 46 splits the total fluid flow downstream of the disc 16 into two symmetrical portions each flowing through the hemispherical space lying to one side of the tail 46 and between it and the interior wall of the tube 18. In this particular modification, the oscillatory fluid flow downstream from the space $x$ between the base 14 and disc 16 is stabilized in a fixed plane coincident with or parallel to the plane of the tail 46. Therefore, the sensor again is caused to detect the organized frequency and amplitude of the fluid flow oscillations for a given fluid flow velocity within the tube 18 and the sensing element 24 readily detects the directly correlated change in frequency of oscillations when the flow velocity is changed.

Rather than using a stabilizer element which orients the oscillations as illustrated in FIG. 4 it is possible to employ a plurality of sensor elements 48 positioned, circumferentially in the tube 18. The signals from the sensor would be fed into a filter which passes only the signal of maximum strength. The signal conditioning equipment, not shown, employed to transform the signal to an electrical wave form, would be consistently fed a signal of relatively constant amplitude and whose frequency corresponds to the mean axial flow velocity within the tube 18.

The determination of airplane altitude can be accurately achieved by measuring directly, in addition to the airspeed, the total air temperature and the air stagnation pressure.

Total air temperature can be accurately measured by means of commercially available equipment such as a thermocouple, thermistor or a resistance temperature detector encased in a suitable surrounding to minimize recovery, radiation and conduction errors.

Similarly, the air stagnation pressure can be accurately measured by means of commercially available equipment namely, impact tubes used for measuring total pressure, such as a pitot tube.

It is well known that certain relationships exist with respect to compressible fluids:

$$T_o/T = 1 + (k-1)/2\ M^2 \quad (1)$$

$$P_o/P = (1+ (k - 1)/2\ M^2)^{k/k-1} \quad (2)$$

$$M^2 = U^2/kg_c RT \quad (3)$$

where
$g_c$ = constant
$T_o$ = total air temperature
$T$ = static air temperature
$k$ = constant
$M$ = Mach number
$U$ = airspeed
$P_o$ = stagnation pressure
$P$ = stagnation pressure
$R$ = Gas constant The foregoing relations can be combined to give the following result:

$$P = \frac{P_o}{\left(1+\dfrac{CU^4}{T_o-CU^4}\right)^n} \quad (4)$$

where:

$C = (k-1/2g_c\ kR)$, a constant $n = k/k-1$, a constant

Applying the foregoing specifically to air, it is seen that $C = 8.33 \times 10^{-5}$ [seconds² degrees (Rankine)/square feet]

$n = 3.5$

The altitude is a function of the static pressure and can readily be determined by reference to standard conversion tables or computed by standard formulas well known to those versed in the art.

It should be noted that every part of the structure of the invention should be provided with means for deicing. The simple configurations of the elements of the invention readily lend themselves to deicing by means of commercially available heat filaments, which are embedded in the surface of the vanes 21, vanes 20, body 10, connecting rod 15, disc 16 and the various vanes and sensors.

As described above, the apparatuses for measuring the velocity of flowing fluids, by which the invention may be practiced, in general require a fluid oscillation generator composed of an obstruction member which has a central longitudinal axis and a second member which is spaced by a predetermined distance from one end of the obstruction member and aligned in such position that a projection of the central longitudinal axis from the specified end of the obstruction member passes through the second member. The maximum cross-section of the second member perpendicular to the projected longitudinal axis must be less than the maximum cross-section of the obstruction member perpendicular to its central longitudinal axis, so that when the generator is placed within a flowing fluid with the central longitudinal axis of the obstruction member aligned substantially parallel to the direction of fluid flow and the second end of the obstruction member pointed upstream, oscillations are generated in the motion of the fluid flowing in the wake downstream from the second member. As previously described, these oscillations can be of random nature inasmuch as any plane passed through the oscillations will vary randomly in angular position relative to the projected central longitudinal axis of the obstruction member, or can be stabilized so as to maintain the plane of the oscillation as a constant.

The aircraft industry commonly employs redundant systems as a safety feature. In the case of pitot tubes, for example as many as eight are used in a single installation.

In the instant system three separate measurements must be taken by three separate instruments. The airplane could thus require as many as twenty four elements protruding from the fuselage of the airplane.

Figure 6:
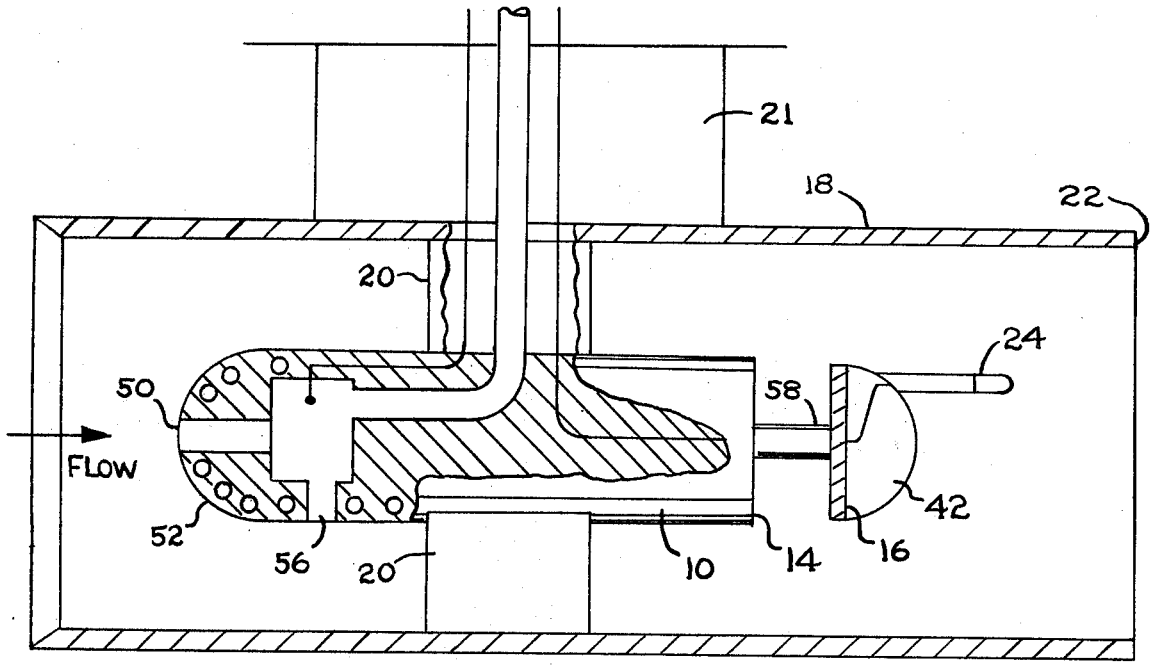
FIG. 6 is a fragmentary side elevational view, partly in cross-section, of another modification of a device in accordance with the present invention.
Figure 5:
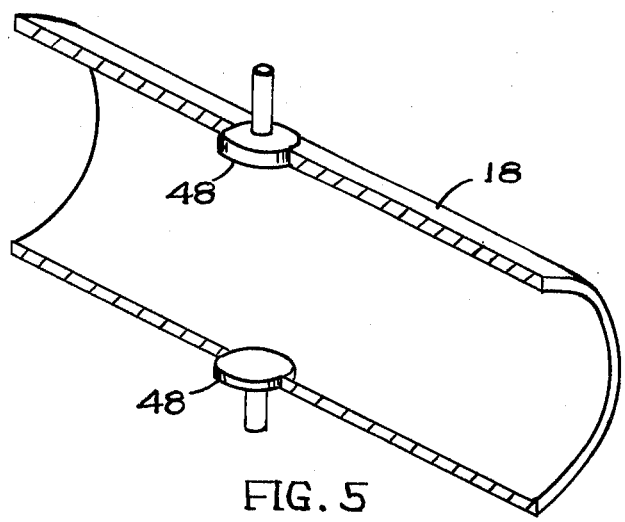
FIG. 5 is a perspective view, partly in cross-section, of a modification of the sensor elements used in conjunction with the structure of the instant invention.

As illustrated in FIG. 6, the air speed measuring device can actually be a multipurpose instrument.

The cylindrical body 10 is provided with a pitot type opening 50 in its nose portion 52. The exact shape of the nose portion 52 of the cylindrical body 10, is not narrowly critical, insofar as the air-speed measurement is concerned. Therefore, the shape can be controlled by the requirements of the device insofar as its use for measuring total pressure or air stagnation pressure is concerned.

The device can be provided with a bleed tube 56 of the type typically employed in pitot tubes for disposal of accumulated water or the like.

As illustrated in FIG. 6, a temperature sensitive element 54, such as a thermocouple, thermistor or the like is positioned within the pitot chamber portion of the cylindrical body 10.

In both the case of the pitot tube and the temperature sensor, the connections to the readout equipment can run through the cylindrical body 10, one of the vanes 20, and the mast 21, into the fuselage of the airplane. Similarly, the connections for the sensor 24 can run through the disc 16, the connecting rod 58, body 10, vane 20 and mast 21. We claim:

1. An aircraft airspeed meter comprising a flow tube attachable to the aircraft; a cylinder-disc assembly positioned within the tube on the tube axis by means of vanes, at least one of which is of hollow construction; the disc being located downstream from the cylinder so that air flowing from the cylinder onto the disc is caused to form oscillations in the wake zone beyond the disc; sensor means carried by the disc for counting the oscillations; said sensor means having a sensing surface located an appreciable distance downstream from the disc; the hollow nature of said one vane enabling the sensor wiring to extend through the vane and thence into the cylinder; the downstream face of the disc being provided with an additional vane that acts to stabilize the oscillations in the stabilizer vane plane; said stabilizer vane acting as a support structure for the oscillation sensor means; said sensor means having a sensing surface located downstream from the stabilizer vane trailing edge.

* * * * *